E. DEAN & C. O. POTTER.
Improvement in Apple-Corer and Slicer.
No. 128,865. Patented July 9, 1872.
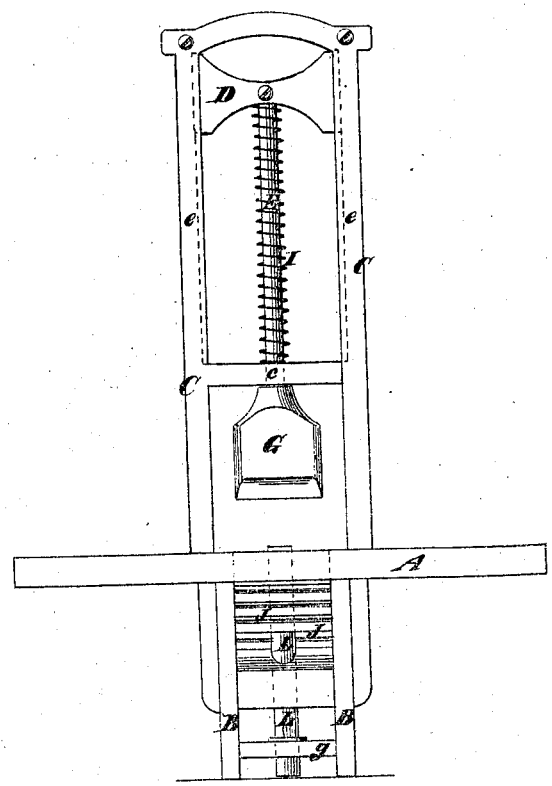
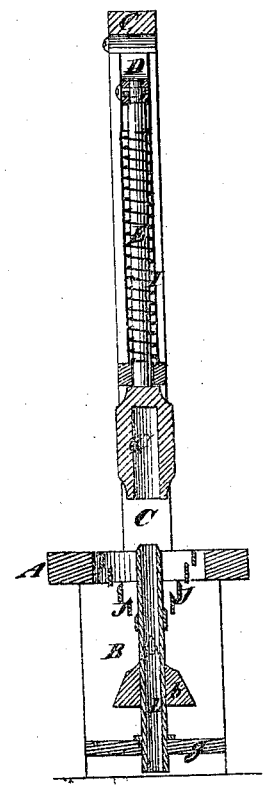
Witnesses:
Fred Hayner
R. F. Rabeau
Eliphalet Dean
Charles O. Potter

UNITED STATES PATENT OFFICE.

ELIPHALET DEAN AND CHARLES O. POTTER, OF JERSEY CITY, NEW JERSEY.

IMPROVEMENT IN APPLE CORERS AND SLICERS.

Specification forming part of Letters Patent No. 128,865, dated July 9, 1872.

Specification describing a new and useful Machine for Slicing and Coring Fruit, the invention of ELIPHALET DEAN and CHARLES O. POTTER, both of Jersey City, in the county of Hudson and State of New Jersey.

This invention is designed for slicing and coring fruits, like apples and pears. It consists in a novel combination of a plunger and corer with a series of knives, all arranged as shown and described hereinafter.

In the accompanying drawing, Figure 1 is a front view of a machine constructed according to my invention; and Fig. 2 is a transverse vertical section of the same.

Similar letters of reference indicate corresponding parts in both figures.

A is a table, which has in it a central opening, $a$, and is supported on two standards, B B. C is a frame which is secured to these standards, and has parallel sides $e$ $e$, in the upper part of which are formed guides, within which slides a cross-head, D, to which is attached a rod, E, furnished at the lower end with a plunger, G, whose lower portion is hollowed out to slip over the end of the corer. Surrounding said rod, between the head D and a cross-piece, $c$, of the frame C, is a spring, I, which throws the cross-head and attached plunger up when not in use, and after every cutting and coring operation. J J are the knives. They are arranged horizontally and parallel, with their sides in vertical planes, and their edges upward between the standards B B, and at a distance apart equal to the thickness of the slices to be cut; but instead of being arranged side by side are arranged one above another, so that the whole are in the form of two reversed series of steps descending toward the other, as shown more particularly in Fig. 2. L is the corer, which consists of an upright metal tube, having a thin upper end to form a cutting-edge. It is arranged vertically, midway between the standards B, in stretchers or cross-pieces $b$ and $g$, in which it is supported between the two series of knives, so that its upper end projects slightly above the bed or table A.

To use the machine for coring and slicing the fruit is placed within the hole $a$ in the table A, and the head D is taken by the hand and it and the attached plunger thereby forced down, and the fruit pressed against the corer and knives, and by coming successively in contact with the latter is successively sliced and freed from the machine at the same time, as by the action of the corer it has its core removed. After each downward stroke of the plunger the spring J raises it.

Claim.

The combination of the plunger G, corer L, and knives J, all arranged for operation as shown and described.

ELIPHALET DEAN.
CHARLES O. POTTER.

Witnesses:
FRED. HAYNES,
R. E. RABEAU.